United States Patent
Mackay et al.

(10) Patent No.: US 8,432,054 B2
(45) Date of Patent: Apr. 30, 2013

(54) WIND TURBINE WITH HYDROSTATIC TRANSMISSION

(75) Inventors: Gary Mackay, Ancaster (CA); Roland Vander Straeten, Guelph (CA)

(73) Assignee: Wind Smart, Inc., Ancaster, Ontario (CA)

( * ) Notice: Subject to any disclaimer, the term of this patent is extended or adjusted under 35 U.S.C. 154(b) by 16 days.

(21) Appl. No.: 13/158,710

(22) Filed: Jun. 13, 2011

(65) Prior Publication Data
US 2012/0313377 A1 Dec. 13, 2012

(51) Int. Cl.
*F16D 31/02* (2006.01)

(52) U.S. Cl.
USPC .................................. 290/44; 290/55; 60/398

(58) Field of Classification Search .................... 290/44, 290/54–55; 60/398
See application file for complete search history.

(56) References Cited

U.S. PATENT DOCUMENTS

| | | | |
|---|---|---|---|
| 4,149,092 A | 4/1979 | Cros | |
| 4,503,673 A * | 3/1985 | Schachle et al. | 60/398 |
| 6,748,737 B2 * | 6/2004 | Lafferty | 60/398 |
| 7,418,820 B2 * | 9/2008 | Harvey et al. | 60/487 |
| 7,863,767 B2 * | 1/2011 | Chapple et al. | 290/54 |
| 7,932,620 B2 * | 4/2011 | Plant, Jr. | 290/55 |
| 2009/0273186 A1 * | 11/2009 | Plant, Jr. | 290/44 |
| 2010/0135791 A1 * | 6/2010 | Melius | 416/1 |
| 2011/0109094 A1 * | 5/2011 | Kenway et al. | 290/55 |

FOREIGN PATENT DOCUMENTS

| | | |
|---|---|---|
| JP | 2005248738 A | 9/2005 |
| WO | 2011/003405 A2 | 1/2011 |

* cited by examiner

*Primary Examiner* — Truc Nguyen
(74) *Attorney, Agent, or Firm* — Buchanan Ingersoll & Rooney PC

(57) ABSTRACT

A wind turbine has a rotor; a hydraulic pump coupled to the rotor, two or more variable displacement hydraulic motors which are driven by fluid flow from the hydraulic pump, at least one generator coupled to the variable displacement hydraulic motors and a closed loop hydraulic oil circuit for carrying pressurized oil from the hydraulic pump to the motors and to return oil to the pump from the motors. A controller in the closed loop hydraulic oil circuit controls the flow of oil in the closed loop circuit and displacement in each of the variable displacement hydraulic motors. Control of flow in and out of the motor for each revolution of that motor controls the flow to the hydraulic pump which has a fixed displacement, thereby controlling its rpm, thereby controlling the rotor rpm. A hydraulic accumulator can be provided in the closed loop.

10 Claims, 3 Drawing Sheets

WIND TURBINE WITH HYDROSTATIC TRANSMISSION

FIELD OF THE INVENTION

The present invention relates to wind turbines.

BACKGROUND OF THE INVENTION

Wind turbines use wind energy typically to generate electricity. A conventional wind turbine includes a rotor mounted on a tower. The rotor may turn up to about 30 rpm to 120 rpm dependent on the wind turbine in a steady wind of about 12 meters per second and connect to an alternator/generator through a speed increasing transmission. Typical generators include synchronous or asynchronous generators and require a constant output shaft speed of about 1200 to 1800 rpm, depending on the type of generator, to produce quality power. Although variable speed generators are available, the power output of a variable speed generator must be conditioned before it can be fed into a power grid.

The aerodynamic efficiency of a wind turbine is very much dependent on the control of the rotor speed. Many wind turbines have a gear train that is connected to the rotor. It is a continuing problem with wind-driven turbines to provide a cost-effective method of smoothing the torque generated by the rotor so as to reduce torque fluctuations in the drive train to the generator. Turbulence is one of the sources of gear box problems, and torque ripple coming into the grid.

Wind turbines using an open loop hydraulic system in place of mechanical transmissions are also known. However, conventional hydraulic pumps require input speed of a minimum of about 300 to 500 rpm to produce usable hydraulic pressure. As a result, a mechanical speed increaser is still required between the rotor and the hydraulic pump. Most hydraulic systems for wind turbines utilize an open loop system. For example, in U.S. Pat. No. 4,503,673, a positive displacement hydraulic pump connected to a variable displacement hydraulic motor is disclosed. In this system, similar to other open loop systems, the hydraulic pump is elevated on the tower but the hydraulic motor, hydraulic fluid reservoir and generator are on the ground. Although it is generally advantageous to reduce the tower load, this arrangement necessitates long hydraulic fluid hoses to and from the hydraulic pump, which is disadvantageous. Additionally, in the system disclosed in U.S. Pat. No. 4,503,673, complex hydraulic controls are used to feather the rotor propeller blades in order to deal with excess pressure in the hydraulic circuit.

In an open-loop hydraulic system, when the rotor is driven at high speed, excess hydraulic pressure may be diverted by "dumping" pressure to maintain a constant generator speed. This energy dissipation generates tremendous amounts of heat and active cooling or heat exchanging is necessary. For example, in U.S. Pat. No. 4,149,092, a hydraulic system for water and wind driven turbines is disclosed which includes a shunt-connected energy dissipator. In response to high pressure caused by high wind and rotor speeds, the displacement of the hydraulic motor decreases, further increasing system pressure. As a result, the hydraulic fluid is diverted into the energy dissipator. The dissipator converts hydraulic energy into heat which is removed by a heat exchanger In a conventional hydrostatic transmission, a prime mover drives a pump which converts power into hydraulic pressure. The hydraulic pressure is then transmitted to a hydraulic motor which converts the pressure back into power, which may then be used to power a load. The hydraulic fluid returns to a reservoir, which feeds the pump. In the context of prior art wind turbines, the rotor is the prime mover and the load is the electrical generator.

In the field of hydrostatic transmissions, an "overrunning" or "overhauling" load condition is a state where a hydraulic motor is mechanically driven by its load, rather than the converse. An example of an overrunning load is the instance when a vehicle with a hydrostatic transmission is driven down a downgrade. In that case, the road wheels impart torque to the hydraulic motor which in turn acts on the pump. It is assumed that both the motor and the pump are pressure reversible. The pump may then regenerate horsepower back into the prime mover. In effect, the pump and motor exchange functions and energy flows in reverse. This ability of the pump to regenerate power in the prime mover is referred to as dynamic braking capability.

Harvey et al. in U.S. Pat. No. 7,418,820 teach that a closed loop hydraulic system which may effectively deal with an "overrunning" load condition may successfully be applied to a wind turbine to provide efficient transmission of energy from the turbine rotor to the generator. They also teach that a low-speed, high torque hydraulic motor driven by the wind turbine rotor at a low speed to create an overrunning load condition, may efficiently drive such a hydraulic system. The motor acting as a pump is preferably directly driven by the rotor, without any speed increasing gears. Similarly, a variable displacement pump which is driven by the overrunning load to reverse its function may be effectively used to drive the electrical generator. The reversal of component roles permits the electrical startup of the rotor in a startup procedure.

Harvey et al. failed to recognize that the aerodynamic efficiency of a wind turbine is very much dependent on the control of the rotor speed. Hence, they fail to teach or suggest any mechanism for controlling rotor speed. Additionally, they provide a single (variable displacement) hydraulic motor connected to a generator. But, we have found that a single hydraulic motor typically results in unacceptably low efficiencies at the low to mid power range.

Therefore, there is a need in the art for a wind turbine system utilizing a closed loop hydrostatic transmission which mitigates the difficulties of the prior art.

SUMMARY OF THE INVENTION

It is well known that a hydraulic motor which is driven by the flow of hydraulic fluid can act as a pump. Consequently, the same apparatus may be interchangeably used as either a pump or a motor. In describing the present preferred embodiments the components are indentified as a pump or a motor in accordance with their function during normal operation. In one embodiment, the hydraulic pump is preferably a low-speed, high torque motor.

We provide a wind turbine comprising a rotor; a hydraulic pump coupled to the rotor, two or more variable displacement hydraulic motors preferably mounted on a single shaft driven by the rotor. That shaft is coupled to a generator. A closed loop hydraulic oil circuit carries pressurized oil from the hydraulic pump to the motors and returns oil to the pump from the motors. A controller controls the flow of oil in the closed loop circuit and controls the variable displacement of each pump via the swash plate controller or other controller that is associated with the particular type and brand of motor that is used. The control is dependent on the aerodynamic and other characteristics of the wind turbine. The maximum displacement of the two or more hydraulic motors may be different from one another in order to configure the most efficient system for a particular wind turbine.

We also prefer to provide at least one hydraulic accumulator in the closed loop. The accumulator or accumulators will dampen mid to high frequency oscillations generated by wind turbine tower shadow effect and turbulence characteristics. The actual sizing of the accumulators is dependent on the desired characteristics of the wind turbine.

We also prefer to provide auxiliary pumps in the closed loop. One of those auxiliary pumps may be connected to an electric motor and is used during start-up. Preferably all of the components are mounted in the nacelle of the wind turbine. However, we also provide an embodiment in which the hydraulic motors and generator are housed in the tower of the wind turbine.

Other objects and advantages of my wind turbine will become apparent from the description of certain present preferred embodiments shown in the drawings.

DETAILED DESCRIPTION OF THE PREFERRED EMBODIMENTS

We provide a wind turbine having a closed loop hydraulic system to transfer torque from the wind-driven rotor to a generator. When describing the present invention, all terms not defined herein have their common art-recognized meanings. As used herein, a "closed loop" hydraulic system is equivalent to a closed circuit hydraulic system and refers to a hydraulic system where a substantial portion of the hydraulic fluid returns directly to the hydraulic pump after passing through the hydraulic motors. In a closed loop system, the hydraulic fluid does not return to an open fluid reservoir or tank but rather flows in a complete path from the pump, through a conductor to the motor and back to the pump. As used herein, "hydraulic oil" or "oil" refers to any suitable hydraulic fluid as is well known in the art. The system here disclosed incorporates well known principles of hydraulic power transmission and control systems for hydraulic power transmission systems.

In one embodiment, the hydraulic motor, pump and electrical generation system of the present invention are intended to be mounted in a nacelle elevated on a tower of the wind turbine. The rotor and propeller blades of the wind turbine may be of any design. In another embodiment some of the components of the system are in the nacelle while other components are in the tower. More specifically, I provide a hydraulic pump housed in the nacelle, while the tower contains the hydraulic motors on a common shaft connected to a generator mounted on thrust bearings. It is conceivable that components of the system may be housed at ground level. The present invention may be adapted by one skilled in the art to any wind turbine or water-driven system where the wind or water energy creates a relatively slow input shaft speed, in the order of 30 rpm and 120 rpm.

Figure 1A:
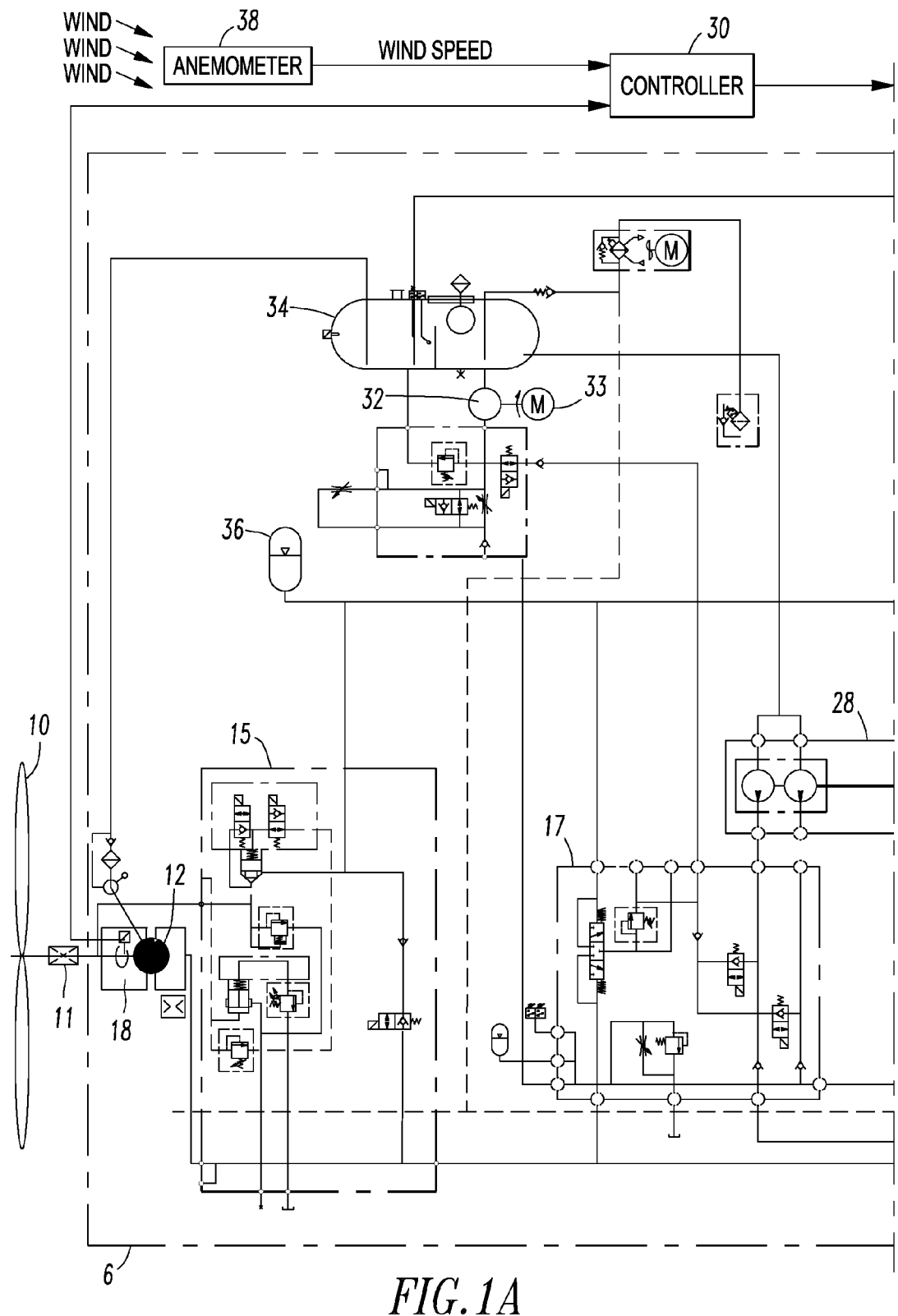
FIGS. 1A and 1B together are a schematic representation of one embodiment of my wind turbine with hydrostatic transmission.
Figure 1B:
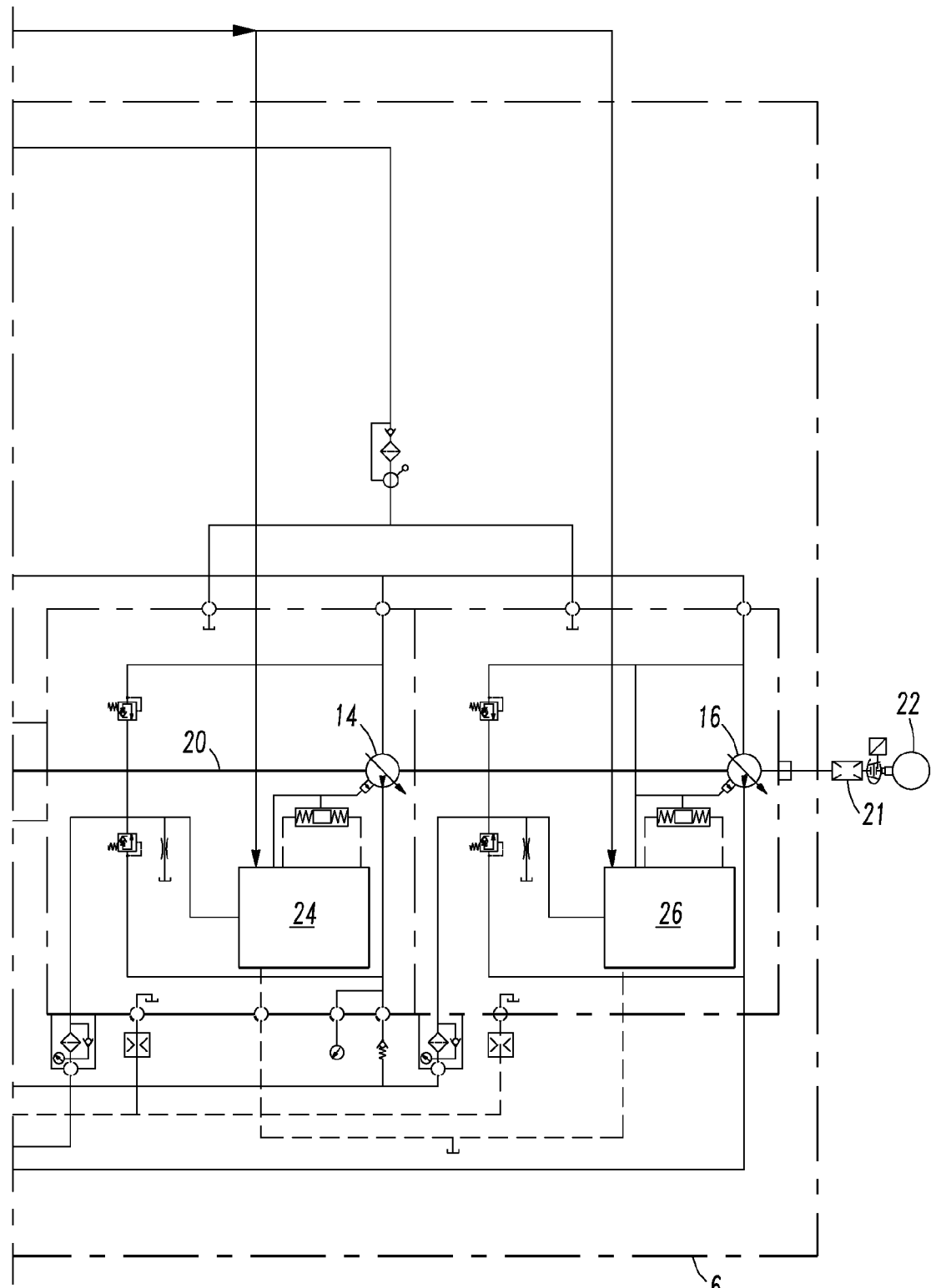

A first present preferred embodiment is shown in FIGS. 1A and 1B. In general terms, the rotor 10 drives a hydraulic pump 12, through a coupling 11. As used herein, the rotor comprises the rotating blade assembly and hub of a wind turbine. In a preferred embodiment, the rotor 10 drives the pump 12 without any gearbox or mechanical speed increasing device. Wind driven three bladed rotors in a wind turbine typically do not exceed 60 rpm to 80 rpm. Therefore, a preferred pump 12 will be able to produce adequate flow with an input shaft speed of less than about 100 rpm and more preferably less than about 60 rpm.

The pump may be a low-speed, high torque hydraulic motor such as the Denison Calzoni motors available from Denison Hydraulics, Marysville, Ohio, U.S., the Viking motor available from Hagglunds Drive AB, Mellansel, Sweden and similar motors available from numerous other manufacturers. These motors act as a pump in my system. One skilled in the art will recognize that the term "low-speed, high torque" refers to a motor designed to generate high torque and have a maximum output shaft speed of less than about 200 rpm.

The hydraulic pump 12 drives two hydraulic motors 14, 16 which are on a single shaft 20. That shaft is coupled to a generator 22 through a coupling 21. A speed transducer 23 may be provided between the coupling 21 and the generator 22. More than two hydraulic motors and more than one generator could be provided. The hydraulic motors can be mounted in various configurations. There could be multiple generators on one shaft or on multiple shafts, and the motors could be mounted on the shaft or shafts via a clutch to allow non-rotation of a motor while other motors are rotating. A closed loop hydraulic oil circuit defined by hydraulic lines 40 carries pressurized oil from the hydraulic pump to the motors and returns oil to the pump from the motors. The hydraulic motors are driven by hydraulic oil that passes through a closed loop circuit. A transmission system controller controls the flow of oil in the closed loop circuit and controls the variable displacement of each motor 14, 16 via the swash plate controller or other controller 24, 26 that is associated with the particular type and brand of motor that is used. Box 6 in dotted line in the drawings encircles the components that comprise the hydraulic system. The control is dependent on the aerodynamic and other characteristics of the wind turbine. The maximum displacement of the two hydraulic motors may be different from one another in order to configure the most efficient system for a particular wind turbine. A valve manifold 17 and other valves are provided as shown in FIG. 1A. Variable displacement hydraulic motors are well known in the art, along with the valves and control units for controlling oil flow within the closed loop circuit.

The transmission system controller 30 controls the swash plate controllers 24, 26 (or in general the controller of displacement of the variable displacement pump either through a swash plate or through any other means that the hydraulic motor manufacturer has decided to use to control the variable displacement). The swash plate controller or other controller associated with each motor is set to control the rotor rpm. The desired rotor rpm set point is calculated by the transmission system controller 30, and is in almost all cases dependent on required power (such as maximum power under any wind condition) and measured wind speed.

We have also found that the addition of one or more accumulators in the hydraulic circuit results in considerable damping of mid to high frequency oscillations generated by wind turbine tower shadow effect and turbulence characteristics. Accordingly an accumulator 36 is provided in closed loop circuit. The actual sizing of the accumulators is dependent on the desired characteristics if the wind turbine.

A small low-flow hydraulic pump 32 is electrically driven by a small electric motor 33 and draws oil from a small hydraulic fluid tank 34. The pump 32 delivers low pressure servo control oil to the auxiliary transmission pumps 28 that are also connected to a shaft 20. This pump is used during start-up.

An anemometer 38 is connected to the transmission system controller to provide wind speed and direction. A sensor 18 measures rotor speed and provides that information to the transmission system controller. This information is used to control fluid flow in hydraulic motors 14, 16. I also provide an emergency stop manifold 15 which can stop rotation of the rotor or stop oil flow through the closed loop circuit.

In a preferred embodiment, the capacity of the motors 14, 16 and the generator 22 are chosen such that the entire output of the pump 12 may be accepted without exceeding the limits of the motors and generator. One skilled in the art will be able to calculate the output based on the rotor 10 configuration, wind speed information and pump 12 configuration.

In a preferred embodiment, a hot oil shuttle 13 is associated with the pump 12 to provide some limited oil exchange and cooling capability. A portion of the oil flow from the low pressure return side of the hydraulic circuit is passed first through the pump 12 to provide some cooling of the pump. In one embodiment, approximately 10% of the total flow in the hydraulic circuit is passed into the hot oil shuttle 13.

The generator 22 may be any known generator adapted for use in a wind turbine. One skilled in the art may choose and configure synchronous or asynchronous induction generators in this regard. In one embodiment, the generator comprises an asynchronous induction generator attached to the power grid. The interconnection between the generator and the power grid may be accomplished in accordance with procedures known in the art.

As is recognized in the art, an asynchronous generator is also an induction motor. As torque is applied to the generator, electrical energy is produced as the generator turns above its synchronous speed. Greater torque will fractionally increase generator speed, within the generator's slip and produce greater power. Therefore, the generator will dynamically brake the pump 12 and the rotor 10 during power generation.

The generator 22 may be a synchronous generator. In synchronous generators, which are well known in the art, the rotational speed of the generator is determined by the main frequency. In a 4 pole synchronous generator connected to a 60 Hz grid, the synchronous generator speed is 1800 rpm. Similarly, in a 6 pole synchronous generator connected to a 60 Hz grid, the synchronous generator speed is 1200 rpm.

The generator converts mechanical energy into electrical energy. If the wind speed results in energy which exceeds the dynamic braking capability of the hydraulic circuit and generator 22, the transmission torque will increase the generator speed beyond the synchronous generator speed or the slip speed of an asynchronous generator. In such over speed conditions, the wind turbine preferably comprises physical or aerodynamic braking mechanisms. Alternatively, or in addition, the rotor speed controller may be used to control rotor speed such that the aerodynamic efficiency is reduced, thereby absorbing less wind energy. In addition, proper setting of high pressure relief valves in the hydraulic circuit allow increased hydraulic losses in the circuit, thereby dissipating energy in the hydraulic circuit and protecting the generator from overloading. The dissipated energy essentially is transformed into heat energy which in itself could feed other applications.

In an alternative embodiment, two or more generators may be included which operate sequentially. If the wind speed results in the torque capacity of a first generator are exceeded, the second generator is brought online to absorb the excess torque and to generate additional power. The use of two or more generators operating sequentially may be advantageous for maximizing efficiency over the medium power range.

In operation, the anemometer 38 will sense wind speed and initiate the system to enter its start up mode. In the appropriate wind conditions, typically once a minimum wind speed is reached, the system may be turned on, either automatically or manually. At the beginning of the start-up mode, the startup electric motor 33 switches on, powering the low-flow pump 32 which then delivers control oil to the servo system of the hydraulic motors 14, 15. Power from the grid, or from a backup power source, is connected to the generator 22 which will then rotate, reaching its synchronous rotational speed. The generator acts as an electric motor and drives the shaft 20 and attached hydraulic motors 14, 16. These motors act as a pump and drive the pump 12, which turns the rotor 10. Assuming there is sufficient wind energy, the rotor will accelerate until its wind-driven rotational speed exceeds a predetermined minimum speed, at which point the rotor is acting on the pump 12. At that point, the system will shift to a power generation mode and the rotor will become an overrunning load on the pump 12 as described above and deliver oil pressure back to the hydraulic motors 14, 16. An rpm sensor 40 on the rotor and/or pressure sensors in the hydraulic circuit will signal the switch over from startup mode to the power generation mode.

Because, in one embodiment, the pump 12 is a fixed displacement motor, the flow of hydraulic fluid is directly proportional to rotor speed. Fluid pressure within the hydraulic system is proportional to torque in the generator. The use of the generator 22 as an electric motor to initiate rotor rotation in a start-up mode permits convenient phase matching with the utility grid. Alternatively, the system may be designed without an active startup procedure as described above. In a passive startup, the system will determine when there is sufficient wind speed to rotate the rotor at a sufficient speed to generate useful power. Once rotor has reached a speed such that the pump 12 is generating sufficient pressure to drive the hydraulic motors 14, 16 to drive the generator 22 at its designed speed, the generator may be switched on to produce electrical power.

The control system of the wind turbine is configured to activate the over speed control systems described above when the torque capacity of the generator, or the pressure capacity of the hydraulic system, or both, is reached. Emergency stops may be programmed into the control system to deal with power irregularities or outages in the utility grid or in extreme over speed situations where the brake systems are not able to control the generator speed.

The speed at which the generator must turn is determined by the power grid to which the generator is connected. Therefore, the shaft 20 and the hydraulic motors 14, 16 connected to the shaft are forced to run at that speed, or if a gear train is used, some speed which is determined by the speed at which the generator must operate and the gear train. The swash plate in each hydraulic motor 14 and 16 essentially controls the flow in and out of the motor for each revolution of that motor, thereby controlling the flow to the hydraulic pump 12 which has a fixed displacement, thereby controlling its rpm, thereby controlling the rotor rpm.

Figure 2:
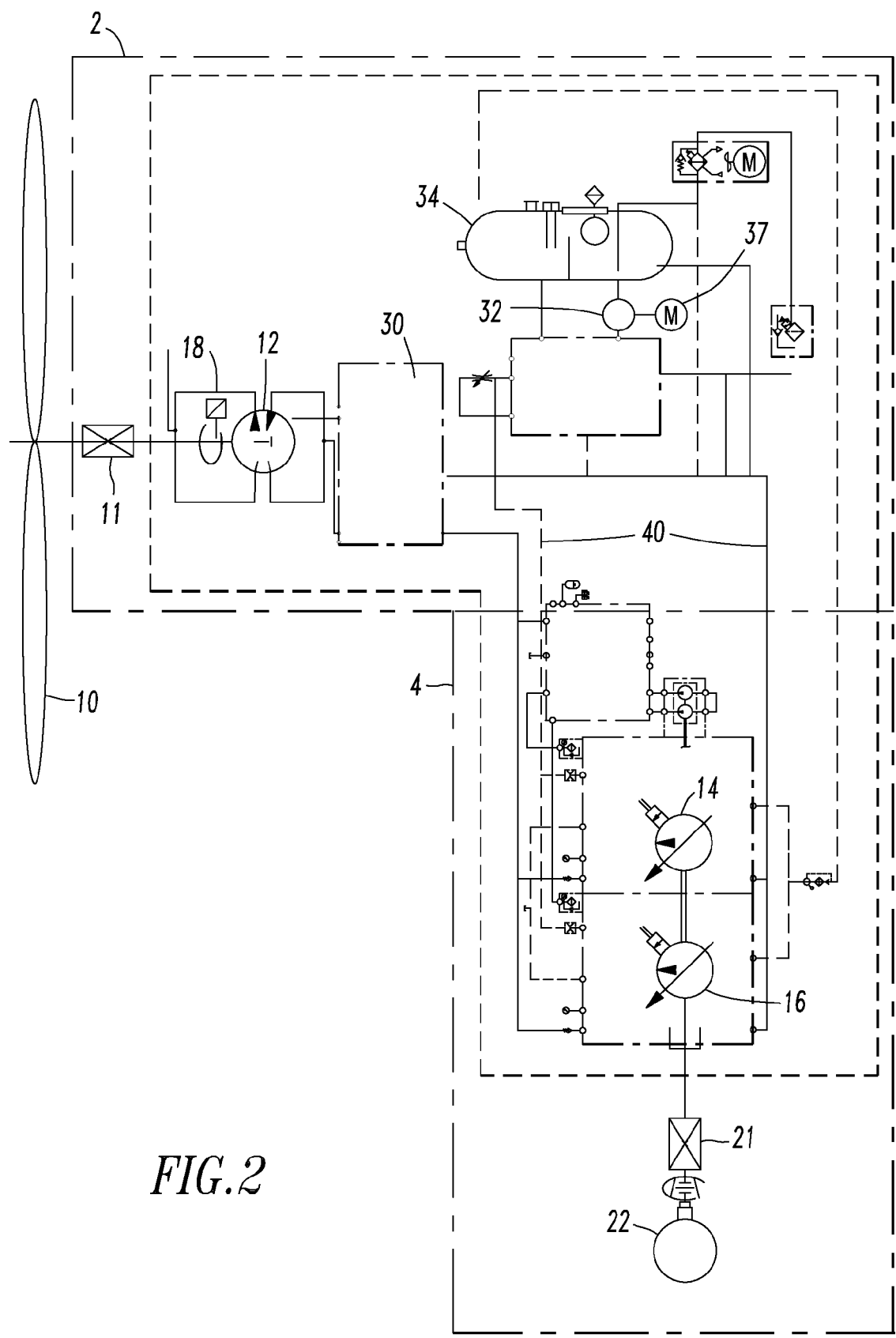
FIG. 2 is a schematic diagram of a second embodiment thereof.

A second present preferred embodiment is shown in FIG. 2 and uses many of the same components as are used in the first embodiment shown in FIGS. 1A and 1B. The same reference numbers are used for those components in FIG. 1A, FIG. 1B and FIG. 2. The second embodiment differs from the first embodiment in that the axis of rotation of the shaft 20 is at a right angle to the axis of rotation of rotor 10. In it, the control systems use the same logic as described with respect to the embodiment shown in FIGS. 1A and 1B. However, geometrically, the hydraulic motors 14, 16 are mounted vertically and in turn are connected to a generator 22 via a coupling. The hydraulic motors 14, 16 and generator 22 are in the wind turbine tower 4 rather than in the wind turbine nacelle 2. This configuration has an advantage because the power cables etc do not have to rotate when the nacelle yaws, and therefore problems with cable wind up are eliminated. This purpose can be similarly achieved by adding a right angle gear box to a conventional wind turbine. However, such systems are complicated, expensive and are maintenance prone. The system described here is very simple, does not increase reliability problems as those associated with right angle gear boxes, and the inefficiency associated with the redirection of hydraulic flow is insignificant. This system can be extended to a system whereby the generator and hydraulic motors are suspended at the base of the tower, without the need for a swiveling hydraulic joint. In this alternative embodiment the components illustrated in FIG. 2 as being within the box 4 that corresponds to the tower would be on the ground and could be inside or outside the tower. An anemometer of the type shown in FIG. 1A would be provided in the embodiment of FIG. 2 but is not shown in the drawing.

In the present system one hydraulic motor acting as a pump is supported in the nacelle and energy is transmitted to the hydraulic motors coupled to at least one generator by the flow of hydraulic oil. The flow of hydraulic oil is controlled so that the rotational speeds of the rotor and the hydraulic motors are synchronized.

The embodiments shown in the drawings all have a rotor which is on a horizontal axis. One skilled in the art may realize that the present invention may equally be adapted to a vertical axis wind turbine. As the hydraulic system here disclosed eliminates the need for a heavy and costly torque shaft which is used in many vertical axis wind turbines today, by allowing two or more hydraulic pumps to synchronize speed and angular position and feeding into one or several hydraulic motors.

Although we have shown and described certain present preferred embodiments of my wind turbine having a hydrostatic drive system my invention is not limited thereto but may be variously embodied within the scope of the following claims.

We claim:

1. A wind turbine comprising:
   (a) a rotor;
   (b) a hydraulic pump coupled to the rotor,
   (c) a plurality of variable displacement hydraulic motors
   (d) at least one shaft to which the plurality of hydraulic motors are attached such that the hydraulic motors drive the at least one shaft
   (f) a generator coupled to the at least one shaft;
   (e) a closed loop hydraulic oil circuit connected to the hydraulic pump and the plurality of variable displacement hydraulic motors, the closed loop hydraulic oil circuit configured to carry pressurized oil from the hydraulic pump to the plurality of variable displacement hydraulic motors, and to return oil from the motors to the pump; and
   (f) a controller and associated valves in the closed loop hydraulic oil circuit which control the flow of oil in the closed loop system and displacement of each of the variable displacement hydraulic motors.

2. The wind turbine of claim 1 wherein the controller comprises a transmission system controller and a motor controller for each of the plurality of hydraulic motors, each motor controller connected to and operated by the transmission system controller.

3. The wind turbine of claim 1 wherein the motor controller is a swash plate controller.

4. The wind turbine of claim 1 also comprising at least one accumulator in the closed loop hydraulic oil circuit.

5. The wind turbine of claim 1 also comprising a tower and a nacelle on the tower and wherein the rotor comprises a horizontal axis wind turbine rotor connected to the nacelle and wherein the hydraulic pump, hydraulic motors, closed loop oil circuit and generator are mounted in the nacelle.

6. The wind turbine of claim 1 also comprising a tower and a nacelle on the tower and wherein the rotor comprises a horizontal axis wind turbine rotor connected to the nacelle wherein the hydraulic pump is in the nacelle and the hydraulic motors and generator are mounted in the tower.

7. The wind turbine of claim 1 also comprising a tower and a nacelle on the tower and wherein the rotor comprises a horizontal axis wind turbine rotor connected to the nacelle wherein the hydraulic pump is in the nacelle and the hydraulic motors and generator are mounted on ground level.

8. The system of claim 1 further comprising an emergency stop component connected to the rotor for stopping the rotor.

9. The system of claim 1 wherein the generator is an asynchronous induction generator.

10. The system of claim 1 wherein the generator is a synchronous generator.

* * * * *